United States Patent
Koguchi

(10) Patent No.: US 7,613,678 B2
(45) Date of Patent: Nov. 3, 2009

(54) DATA TRANSMISSION DEVICE WITH ADDRESS SEARCHING FEATURE, DATA TRANSMISSION METHOD, AND DATA TRANSMISSION PROGRAM

(75) Inventor: Masatsugu Koguchi, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 420 days.

(21) Appl. No.: 10/974,938

(22) Filed: Oct. 28, 2004

(65) Prior Publication Data

US 2005/0289126 A1 Dec. 29, 2005

(30) Foreign Application Priority Data

Jun. 28, 2004 (JP) ............................. 2004-190347

(51) Int. Cl.
*G06F 7/00* (2006.01)
*G06F 17/30* (2006.01)
(52) U.S. Cl. ............................. 707/1; 707/10; 709/225
(58) Field of Classification Search ............... 707/1–10, 707/100–104.1, 200–206; 709/225; 715/273, 715/761, 828, 864
See application file for complete search history.

(56) References Cited

U.S. PATENT DOCUMENTS

| | | | | |
|---|---|---|---|---|
| 5,987,440 A | * | 11/1999 | O'Neil et al. | 705/44 |
| 2005/0174613 A1 | * | 8/2005 | Tan | 358/486 |

FOREIGN PATENT DOCUMENTS

| | | |
|---|---|---|
| JP | 10-079817 | 3/1998 |
| JP | 2002-179722 | 6/2003 |
| JP | 2003-233564 | 8/2003 |
| JP | 2003-274002 | 9/2003 |

OTHER PUBLICATIONS

David Crocker, RFC 822: Standard for the Format of Arpa Internet Text Messages, 1982.*
Xunha et al., An intrusion-tolerant password authentication system, year 2003, IEEE, 100-118.*
Bellavista et al., An integrated management environment for network resources and services, May 2000, IEEE, vol. 18, 676-685.*
A Notice of Reason for Refusal issued in corresponding Japanese Patent Application No. 2004-190347, and translation thereof.
Notification of Reason for Refusal issued in corresponding Japanese Patent Application No. 2004-190347, and translation thereof.
Notification of Reason for Refusal issued in corresponding Japanese Patent Application No. 2004-190347, and translation thereof, all pages.
A Notice of Reason for Refusal issued in corresponding Japanese Patent Application No. 2004-190347, and translation thereof, all pages.

* cited by examiner

*Primary Examiner*—Jean B Fleurantin
(74) *Attorney, Agent, or Firm*—Buchanan, Ingersoll & Rooney PC

(57) ABSTRACT

The MFP used as a data transmission device authenticates a data entering person as a specific user in correspondence with a specific data input, searches data receiving addresses related to the authenticated user among the data receiving addresses of each user registered in the address book, assigns the data receiving addresses located during the search as transmission destinations, and transmits the data to the assigned transmission destinations.

14 Claims, 8 Drawing Sheets

908

| USER NAME | TRANSMISSION METHOD/ DESTINATION | ADDRESS | DISCLOSE |
|---|---|---|---|
| USER A | E-mail | user-A@aaaa.com | O |
| USER A | FTP | .../data/usera | O |
| USER A | PC | .../data | |
| USER A | HDD | USER-A | |
| USER B | E-mail | user-B@aaaa.com | O |
| USER B | FTP | .../data/userb | |
| USER B | HDD | USER-B | |
| USER C | E-mail | user-C@aaaa.com | O |
| USER C | HDD | USER-C | |
| : | : | : | : |
| : | : | : | : |

FIG.11

| TRANSMISSION METHOD/DESTINATION | ORDER OF PRIORITY |
|---|---|
| E-mail | 1 |
| FTP | 4 |
| PC | 3 |
| HDD | 2 |

FIG.12

```
                                         912
                                         /
From:"*****"<******@*******>
To:"*****"<******@*******>
Subject:*******           /
Date:*****              911
:
```

DATA TRANSMISSION DEVICE WITH ADDRESS SEARCHING FEATURE, DATA TRANSMISSION METHOD, AND DATA TRANSMISSION PROGRAM

This application is based on Japanese Patent Application No. 2004-190347, filed on Jun. 28, 2004, the contents of which are hereby incorporated by reference.

BACKGROUND OF THE INVENTION

1. Field of the Invention

The invention relates to a data transmission device, a data transmission method, and a data transmission program.

2. Description of the Related Art

There has been a type of MFP (Multi-Function Peripheral) having an address book function by which the user can register a plurality of addresses so that, when the user wishes to transmit data, the user can select a desired address from a list of registered addresses displayed on the operating screen.

In the meanwhile, another MFP technology is known which checks the user's identity and registers the identified user's address to the "From" address ("Unexamined Publication No. JP-A-2003-179722).

However, if there are many user's address, it is impossible to display all the registered address on the operating screen so that a desired address has to be searched by scrolling the screen or switching the screen.

Moreover, there is another method of MFP usage in which the user sends image data obtained by scanning to the user's own computer in order to view, edit or transfer them to another user using the computer, so that it is desirable for such a user to have an MFP that allows the user to assign the user's own address as a transmission destination.

Moreover, since the address that is registered on the address book can be used freely by the particular MFP, there was a danger of allowing the user to select inadvertently a user's address unrelated to the user or a malevolent user to send unnecessary data or a large amount of data to an address registered in the address book.

In the meanwhile, the technology described in the abovementioned Unexamined Publication is simply to identify the user who transmitted data from the particular MFP and has no consideration for simplification of selection of the transmission destination process during the data transmission or prevention of selecting unnecessary transmission destinations, and did not propose any method for solving these problems.

SUMMARY OF THE INVENTION

It is an object of the present invention to provide a data transmission device, a data transmission method, and a data transmission program, which are improved for solving the abovementioned problems.

A more detailed object of the present invention is provide a data transmission device, a data transmission method, and a transmission program capable of simplifying the selection of a transmission destination during data transmission, simplifying the process of setting up the user him/herself as a transmission destination, and preventing the selection of unnecessary transmission destinations.

According to an aspect of the invention, there is provided a data transmission device, comprising: an address storing unit for storing each user's data receiving addresses; a user authentication unit for authenticating a data entering person as a specific user in correspondence with a specific data input; an address searching unit for searching the data receiving addresses related to the user authenticated by said user authentication unit; an address assigning unit for assigning the data receiving addresses searched by said address searching unit as transmission destinations; and a transmitting unit for transmitting the data to the transmission destinations assigned by said address assigning unit.

According to the present invention, it is possible to simplify the selection of a transmission destination during a data transmission process and the setting up the user him/herself as a transmission destination as well as the prevention of selecting unnecessary transmission destinations, as an address for data reception related to the user authenticated in accordance with a specified data input is assigned as a transmission destination.

According to another aspect of the invention, there is provided a data transmission method comprising the steps of: 1) storing each user's data receiving addresses; 2) authenticating a data entering person as a specific user in correspondence with a specific data input; 3) searching the data receiving addresses related to the authenticated user; 4) assigning the searched data receiving address as transmission destinations; and 5) transmitting the data to the assigned transmission destinations.

According to still another aspect of the invention, there is provided a recording medium storing a data transmission program, said data transmission program causing a computer to execute a process comprising the steps of: 1) authenticating a data entering person as a specific user in correspondence with a specific data input; 2) searching the data receiving addresses related to the authenticated user among each user's data receiving addresses stored in the address storing unit; 3) assigning the searched data receiving address as transmission destinations; and 4) transmitting the data to the assigned transmission destinations.

The features, characteristics and properties of this invention other than those set forth above will become apparent from the description given herein below with reference to preferred embodiments illustrated in the accompanying drawings.

BRIEF DESCRIPTION OF THE DRAWINGS

FIG. 11 is a diagram showing an example of the table for setting up the order of priority concerning the address transmission method to be displayed on the selection screen of a transmission destination.

FIG. 12 is a diagram showing an example of a part of the header unit of an e-mail message.

DETAILED DESCRIPTION OF THE PREFERRED EMBODIMENT

The embodiment of this invention will be described below with reference to the accompanying drawings.

Figure 1:
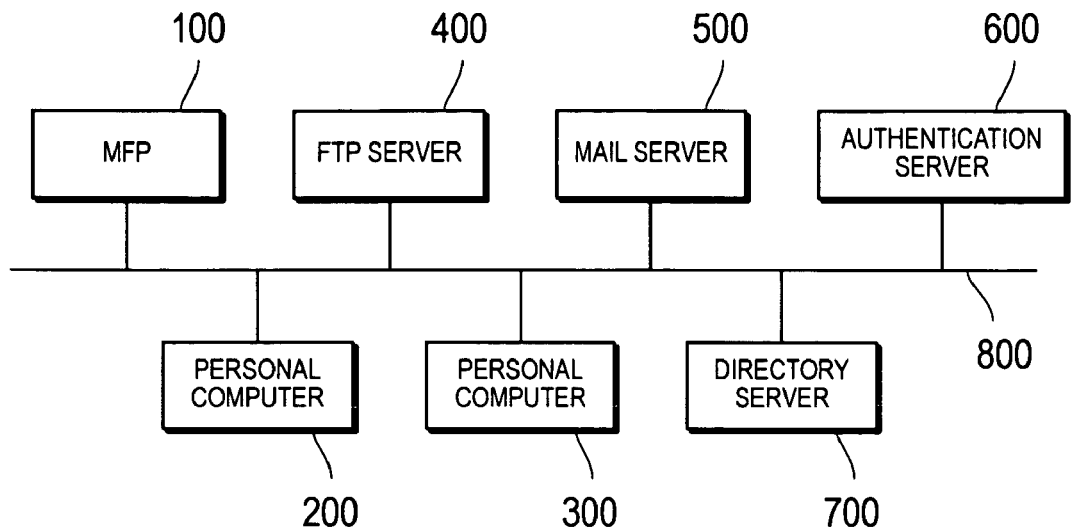
FIG. 1 is a block diagram showing the entire constitution of data transmission system including a data transmission device according to an embodiment of the present invention.

FIG. 1 is a block diagram showing the overall constitution of a data transmission system according to an embodiment of the present invention.

The data transmission system has an MFP 100 having a function of a data transmission device, personal computers 200 and 300, an FTP (File Transfer Protocol) server 400, a mail server 500, an authentication server 600, and a directory server 700, all of which are connected communicably via a network 800.

The network 800 can be a LAN connecting computers and network equipment according to standards such as Ethernet®, Token Ring, and FDDI, a WAN that consists of several LANs connected by a dedicated line, and the Internet. The types and the number of equipment to be connected to the network 800 are not limited to those shown in FIG. 1.

Figure 2:
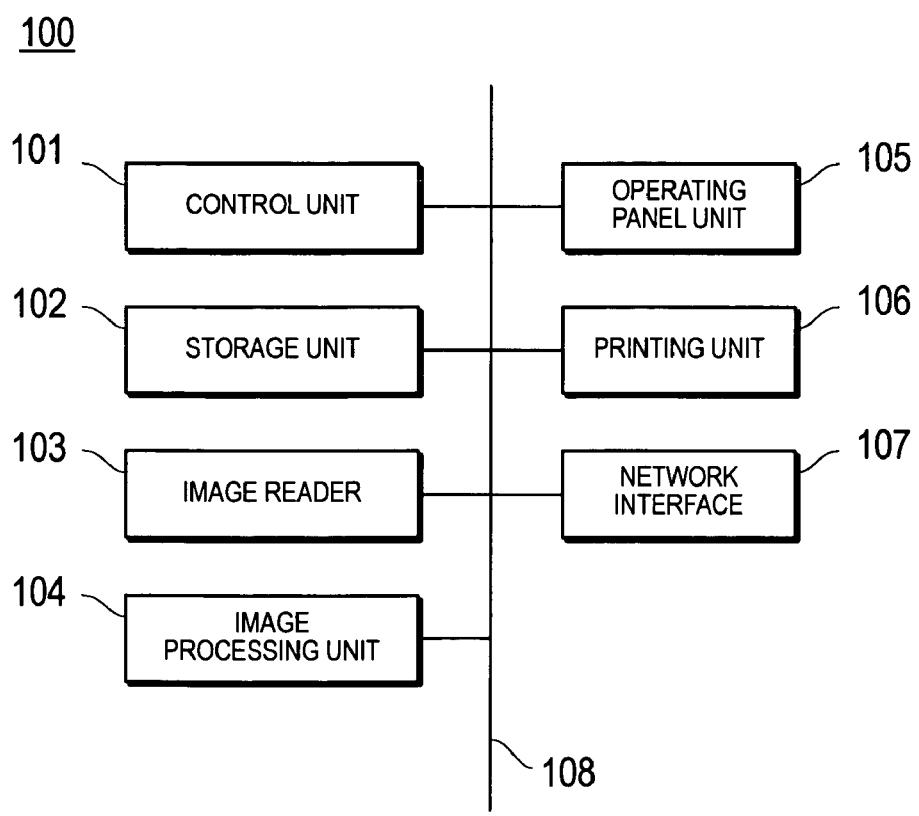
FIG. 2 is a block diagram showing the constitution of an MFP shown in FIG. 1.

FIG. 2 is a block diagram showing the constitution of the MFP 100.

The MFP 100 is equipped with a control unit 101, a storage unit 102, an image reader 103, an image processing unit 104, an operating panel unit 105, a printing unit 106, and a network interface 107, which are connected with each other via a bus 108.

The control unit 101 is a CPU (Central Processing Unit), and controls various parts indicated above and executes various arithmetic processes according to a program.

The storage unit 102 consists of, for example, a ROM, a RAM and a hard disk, stores various programs and various data, and is temporarily used as a working area for executing programs. The storage unit 102 is used for storing image data and others obtained by image processing. The program stored in the storage unit 102 contains a program for client for using the communication service of the mail server. The storage unit 102 stores an address book on which registered are electronic mail addresses to be assigned as the transmission destinations for data transmission. The address book will be loaded on the RAM at the time of the usage.

The image reader 103 can obtain image data by scanning the image of the document. The image reader 103 is equipped with light receiving elements such as CCD for converting reflected lights into electrical signals by lighting the document with a light source and an automatic document feeding device (ADF) for transferring the document to a specified reading position.

The image processing unit 104 performs format conversion that converts the format of image data into a format suitable for data transmission.

The operating panel unit 105 is equipped with a touch screen used for displaying various kinds of information and entering various kinds of instructions, a ten-key pad to be used for setting up the number of copies to be produced and the like, a start key for instructing the start of an operation, a stop key for instructing the stoppage of an operation, a reset key for initializing various setup conditions, etc.

The printing unit 106 prints various data including image data obtained by the image reading unit 103 by scanning and image data received from the external device to recording media such as printing paper.

Network interface 107 is an interface for allowing the system to access the network 800 and communicate with other equipment on the network.

The MFP 100 has, in addition to the copying function, the network scanning function for transmitting the image data obtained by scanning the document to equipment such as the personal computer 200 via the network 800, and the printing function for receiving printing data from equipment such as the personal computer 200 and prints it.

Back to FIG. 1, the FTP server 400 is a computer having file storage and transferring functions.

The mail server 500 is a computer for providing communication service for sending and receiving electronic mail using SMTP and POP.

The authentication server 600 is a server computer for providing a user authentication service, i.e., a service of authenticating that the user is the "particular person who is allowed to use" it. The authentication server 600 controls user names and passwords together.

The directory server 700 stores resources on the network and their attributes and provides a directory service that makes it possible to search them. The resources here are meant to be information about users and organizations that use the network, usable services provided by the server, and usable equipment such as printers. LDAP (Lightweight Directory Access Protocol) is a standard protocol used for accessing to the directory service. The directory server 700 is capable of searching information such as electronic mail address from the user name. The user name is a user's identification code. The directory server 700 stores hierarchical information about the users. Therefore, the directory server 700 can be used for searching an address for the data receiving purpose such as an e-mail address using the user name as a key word.

The personal computers 200 and 300 are the computers to be used by specific users and can receive the electronic mail transmitted by the MFP 100 via the mail server 500.

The MFP 100 communicates with the authentication server 600 to execute the authentication process in order to authenticate a user. The MFP 100 can also communicate with the directory server 700 in order to search a receiving data address.

Next, the data transmission process in the MFP 100 will be described below referring to FIG. 3 through FIG. 12. The algorithm shown in the flowchart of FIGS. 3 and 4 is stored as a program in the storage unit 102 and executed by the control unit 101.

Figure 3:
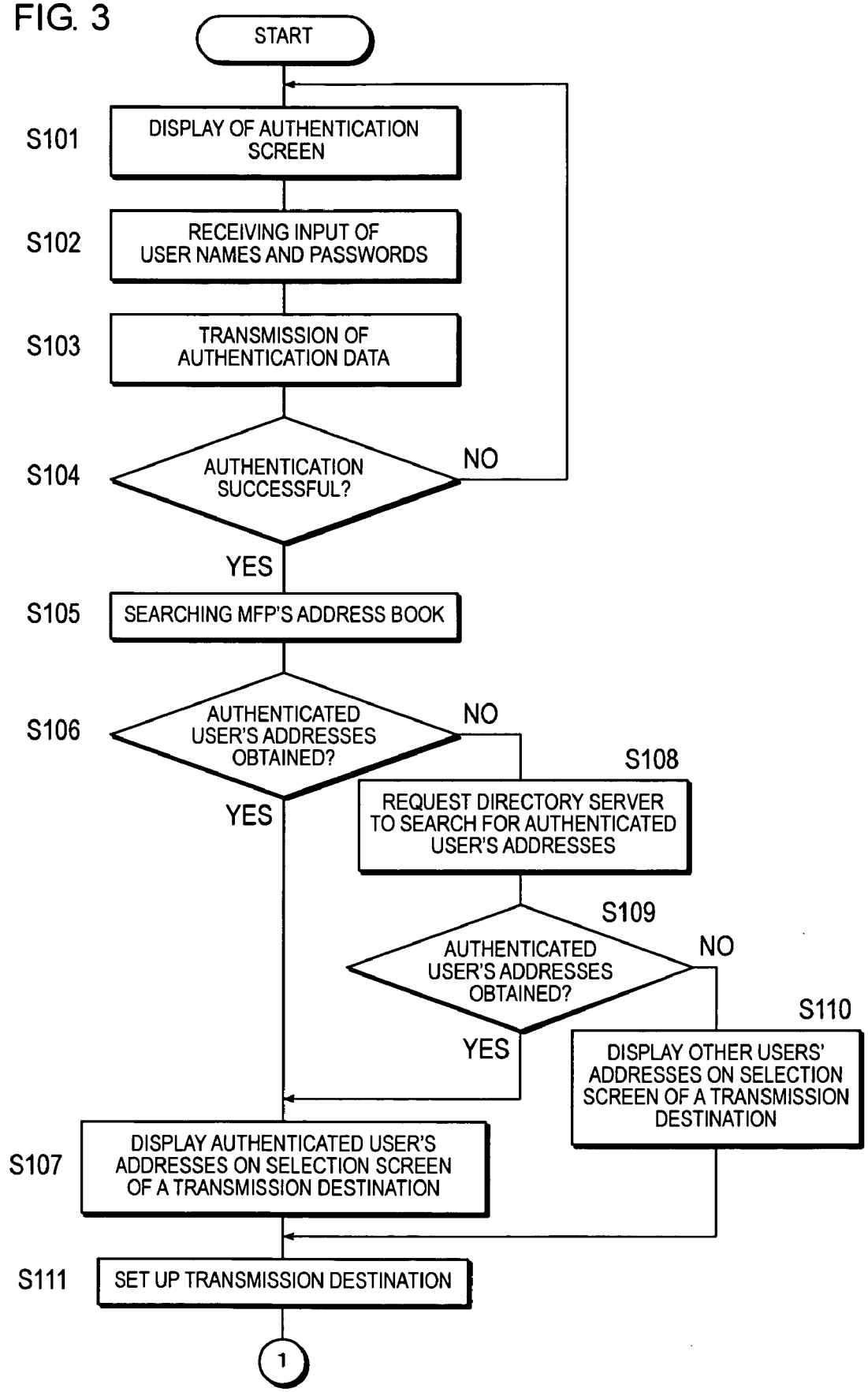
FIG. 3 is a flowchart showing the procedure of data transmission process on the MFP.
Figure 4:
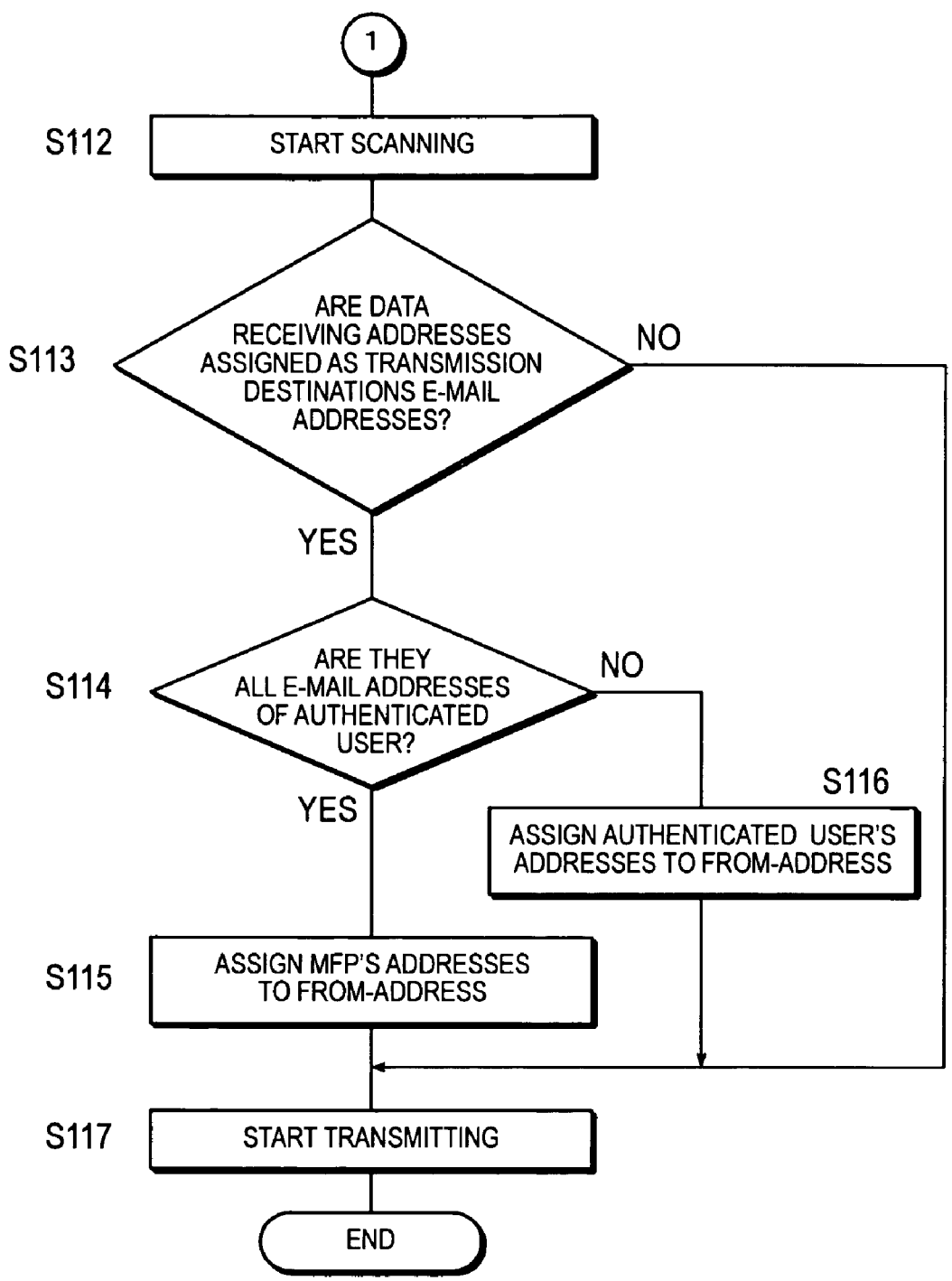
FIG. 4 is a flowchart showing the procedure of data transmission process on the MFP continued from FIG. 3.
Figure 5:
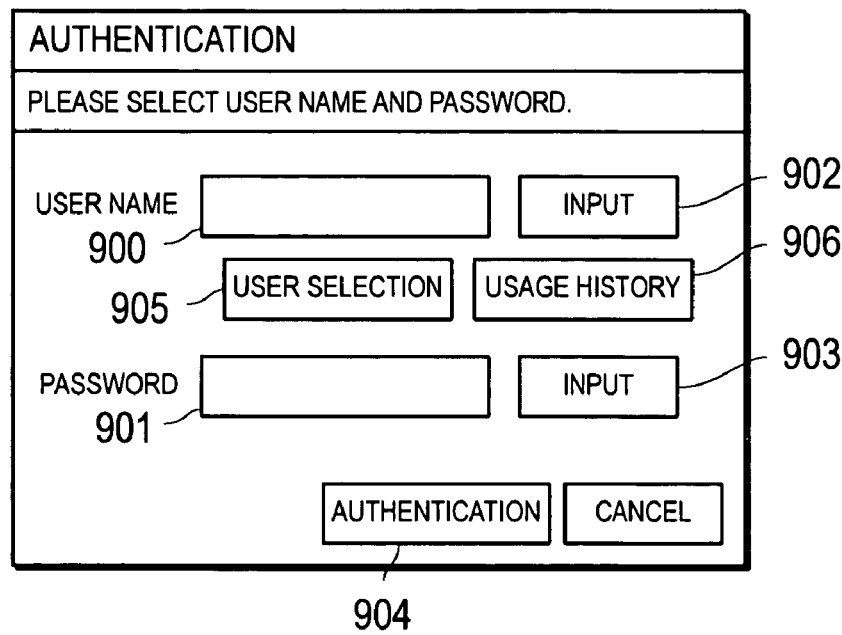
FIG. 5 is a diagram showing an example of the user authentication screen.

Referring to FIG. 3, when a user selects the scanning function (not shown) on the operating panel 105 of the MFP 100, the user authentication screen shown in FIG. 5 will be displayed on the operating panel unit 105 (S101). On the user authentication screen also displayed are a user name input box 900 and a password input box 901 for receiving the input of the password. The user name and the password can be entered by operating the character keys (not shown) that appear as the user presses the input buttons 902 and 903 (S102). When a authentication button 904 is pressed after entering these inputs, the MFP 100 transmits the user authentication data to the authentication server 600 (S103). The authentication server 600 then executes the user authentication process based on said user authentication data.

Figure 6:
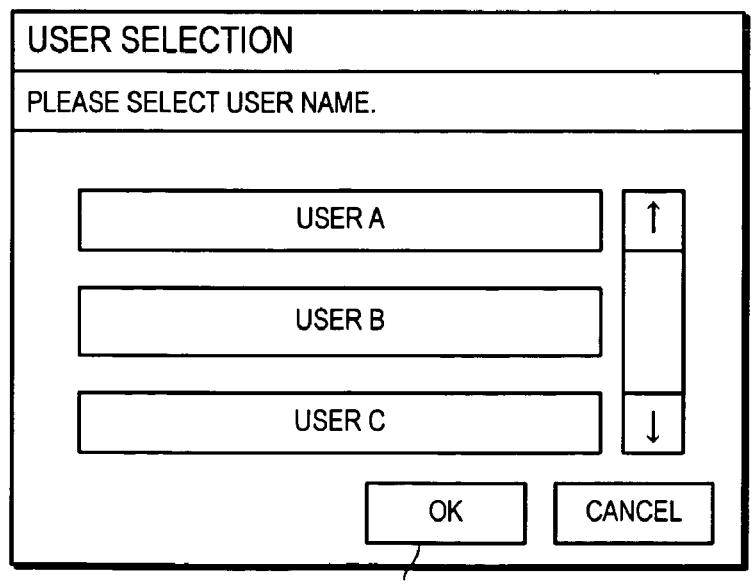
FIG. 6 is a diagram showing an example of the user selection screen.
Figures 7, 8:
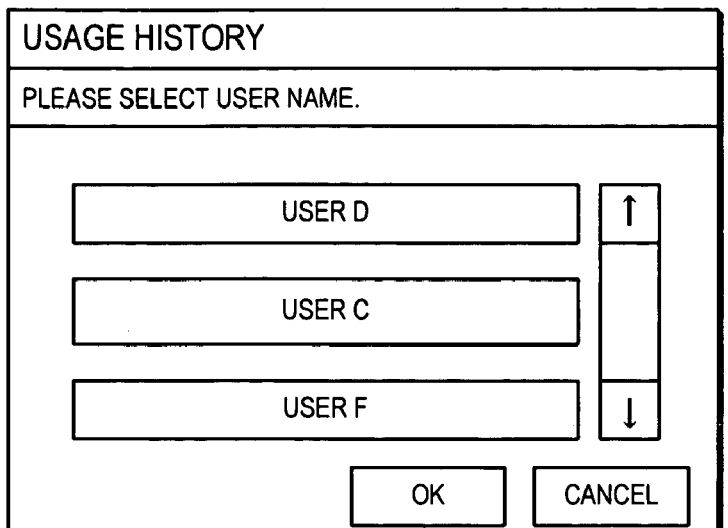
FIG. 7 is a diagram showing an example of usage history image.
FIG. 8 is a diagram showing an example of the address book.

While entering the user name in the step S102, the user can also select and enter the user's own name from the list of user names displayed on the screen switching to a screen shown in FIG. 6 or 7 by pressing either a user selection button 905 or a usage history button 906 shown in FIG. 5. The user names registered in the address book are displayed alphabetically on the screen as shown in FIG. 6. The user names of the MFP 100 are shown in the descending chronological order of their usages with the name used latest at the top on the screen shown in FIG. 7. The storage unit 102 stores the authenticated user's name and the authentication date as history data each time a user is authenticated. When the user selects the user's own name from the user names displayed on the screen and presses an OK button 907 or an OK button 908, the display switches to the screen shown in FIG. 5 again, and the user name selected by the user will be entered into the user name input box 900. Thus, the user can eliminate the step of directly entering the user's own name.

Next, the MFP 100 makes a judgment as to whether it has received a notice from the authentication server 600 that it has succeeded in the user authentication or not (S104).

When it receives a notice from the authentication server 600 that it failed in the user authentication (S104: No), the MFP 100 returns to the step S101 to receive the user name and the password inputs again.

If it receives a notice from the authentication server 600 that it succeeded in the user authentication (S104: Yes), the MFP 100 executes a search for the authenticated user's data receiving address in the address book stored in the storage unit 102 (S105).

The address book will be described below with reference to FIG. 8. The address book consists of items such as user names, methods of transmission/transmission destinations, addresses, and disclosure setting. These items can be entered from the operating panel of the MFP 100, but also can be entered from external devices (e.g., personal computers) via Web utilities and dedicated utilities. It is possible to register for the same user various addresses such as an electronic mail address, a specified address within an FTP server, a specified address within a personal computer, and a specific address on the MFP's hard disk. A user can set up a disclosure criterion for each of the registered user's own addresses in the disclosure setup area whether he prefers to disclose it to other users or not. In FIG. 8, the user A specified the e-mail address and the specified addresses in the FTP server to be disclosed (disclosure setup), and the specified address in the PC not to be disclosed (non-disclosure setup). Thus, a user can limit the reception of data from other user by means of using the disclosure setup item.

Next, the MFP 100 searches whether any data receiving address is registered for the authenticated user in the address book stored in the storage unit 102 (S105).

If the authenticated user's data receiving addresses are obtained (S106: Yes), the MFP 100 displays the selection screen of a transmission destination showing said addresses listed at the top on the operating panel unit 105 (S107).

Figure 9:
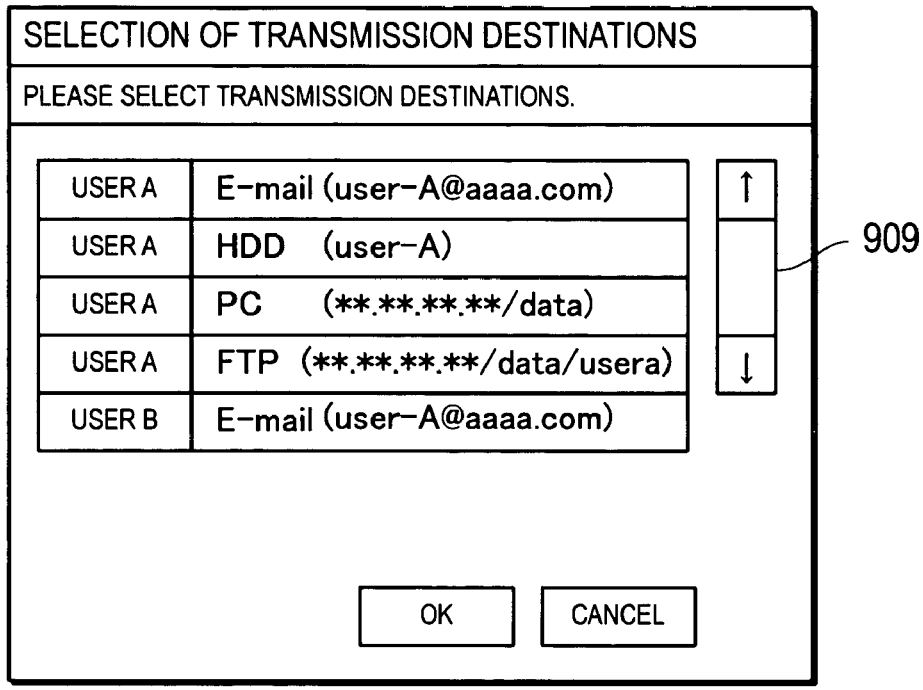
FIG. 9 is a diagram showing an example of the selection screen of a transmission destination.

FIG. 9 shows an example of the selection screen of a transmission destination where the user A is a authenticated user. If the bottom arrow of a scroll bar 909 is pressed while the user A's data receiving addresses are displayed at the top of the selection screen of a transmission destination, other user's disclosed data receiving addresses will be displayed following the user A's data receiving address. Also, among the user A's data receiving addresses, the e-mail address is displayed ahead of other addresses. Thus the data receiving addresses of the same user are displayed according to a predetermined priority order.

On the other hand, if no data receiving address was obtained for the authenticated user (S106: No), the MFP 100 requests a search to the external directory server 700 whether any such address is registered (S108). Upon receiving such a request, the directory server 700 makes a search within the directory server 700 to see if there are any data receiving address exists using the user name as a key word. If a corresponding address is found, the directory server 700 transmits said address to the MFP 100.

Next, if the authenticated user's data receiving address is obtained from the directory server 700 (S109: Yes), the MFP 100 displays the selection screen of a transmission destination having said address listed at the top on the operating panel unit 105 (S107).

Figure 10:
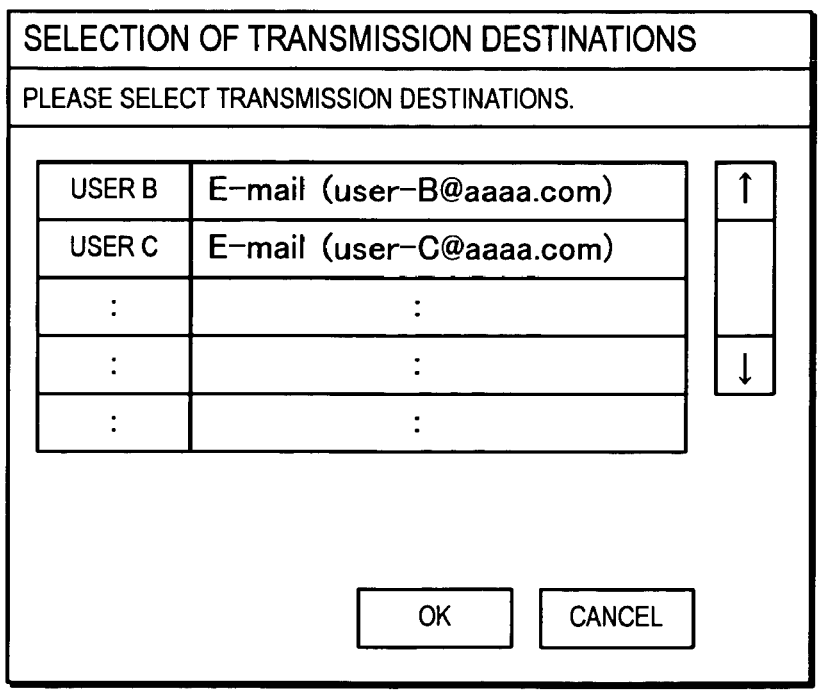
FIG. 10 is a diagram showing an example of the selection screen of a transmission destination with display contents different from that of FIG. 9.

On the other hand, if the authenticated user's data receiving address is not obtained from the directory server 700 (S109: No), the MFP 100 displays the selection screen of a transmission destination listing the disclosed data receiving addresses of other users on the operating panel unit 105 (S110). FIG. 10 shows an example of the selection screen of a transmission destination displayed in a case wherein the user A is a authenticated user and no data receiving address for the user A was received. The operating panel unit 105 is displaying here a selection screen of a transmission destination on which the data receiving addresses of users other than the user A are shown.

The selection screen of a transmission destination also displays an instruction to select the transmission destination as shown in FIG. 9 or FIG. 10. When the user select a transmission destination from the data receiving address displayed on the selection screen of a transmission destination in order to transmit the image data obtained by scanning, the MFP 100 sets up the transmission destination of the image data based on the user's selection (S111). The user can also select a plurality of data receiving addresses as transmission destinations from the data receiving addresses displayed on the selection screen of a transmission destination.

Moreover, the selection screen of a transmission destination displays user names and transmission methods/destinations in addition to the users' data receiving addresses. However, it is also possible to display only user names and data receiving addresses. Furthermore, it can also be used to specify corresponding data receiving addresses by displaying only user names and transmission methods/destinations.

Next, the procedure for setting up the abovementioned order of priority.

FIG. 11 is a diagram showing an example of the table for setting up the order of priority addresses to be displayed on the selection screen of a transmission destination. The table is stored in the storage unit 102, and the priority is set up in the order of e-mail, HDD, PC, and FTP in the column for the transmission method/destination. Addresses are displayed in this order of priority on the selection screen of a transmission destination (see FIG. 9).

The order of priority setting can be executed either by the supervisor or the user. In this case, the abovementioned table contains a table for the supervisor which allows the supervisor to set up the order of priority common to all users and a table for users so that each user can set up his/her own order of priority. If a user finds in using the MFP 100 that the orders of priority are set up already for both the supervisor table and the user table, the user can display addresses in the order of priority set up on the user table; on the contrary, if no order of priority is set up on the user table, the user can display addresses in the order of priority set up on the supervisor table.

The supervisor can set up the order of priority in such a way as to place e-mail addresses above other addresses considering usage frequencies. The user's operating convenience can be improved this way. Furthermore, if it is desired to reduce the load on the FTP server 400 and the mail server 500, the supervisor can set up the order of priority in such a way as to place addresses other than those of FTP and e-mail above others.

Next, in the step S112 shown in FIG. 4, the MFP 100 starts scanning in accordance with the user's instruction. The image data is obtained as a document is scanned.

Next, the MFP 100 makes a judgment as to whether the data receiving addresses assigned as the transmission destination in the step S111 are e-mail addresses or not (S113).

If the data receiving addresses of the transmission destinations are judged that they are not e-mail addresses in the step S113 (S113: No), the MFP 100 starts transmission of the image data by the transmission method corresponding to said addresses (S117).

On the other hand if the data receiving addresses assigned as the transmission destination are e-mail addresses (S113: Yes), the MFP 100 makes a judgment as to whether the e-mail addresses are only of the authenticated user's e-mail addresses (S114).

As shown in FIG. 12, the header of an e-mail message consists of a portion where a From-address 912 is described indicating the transmission source of the e-mail, and a portion where a To-address 911 is described indicating the transmission destination of the e-mail. The e-mail address set up in the From-address 912 by the PC (e.g., PCs 200 and 300) that received the e-mail is displayed as the sender (source of transmission) of the e-mail.

If the e-mail addresses assigned as the transmission destinations are only the authenticated users' e-mail addresses (S114: yes), the authenticated users' e-mail addresses are assigned to To-address 911 and the address of the MFP 100 is assigned to the From-address 912 (S115). When e-mail assigned with such addresses is received by the PC, the user can realize that the user him/herself transmitted said e-mail from the MFP 100. It is also possible to use the supervisor's e-mail address in stead of the e-mail address of the MFP 100.

If the e-mail addresses assigned as the transmission destinations are not only the authenticated users' e-mail addresses (S114: No), the authenticated users' and/or other users' e-mail addresses are assigned to To-address 911 and the authenticated user's e-mail addresses are assigned to the From-address 912 (S116). When e-mail assigned with such addresses is received by a PC, the receiver of the e-mail can identify the sender of said e-mail.

After e-mail addresses are assigned to the To-address 911 and the From-address 912 as discussed above, the image data is transmitted attached to the e-mail (S117).

As can be seen from the above, the present embodiment allows the system to search the data receiving addresses related to the authenticated user in correspondence with the specified data input and assign the same as the transmission destinations of the e-mail. Therefore, even if many user addresses are registered in the MFP, it is easy to search the addresses the user desires, thus simplifying the selection of transmission destinations for data transmission. Also, it is possible to assign the user's own address as the transmission destination such as in a case when the user wishes to send the data to the user him/herself from the MFP, thus simplifying the process of assigning the user him/herself as the transmission destination. Furthermore, since the addresses that are selectable by the user are confined to the data receiving addresses related to the user, it can prevent selections of unnecessary or wrong transmission destinations, prevent the user from selecting an address unrelated to the user, or a malicious user from selecting transmission destinations registered in the address book for the purpose of transmitting unnecessary data.

It is obvious that this invention is not limited to the particular embodiments shown and described above but may be variously changed and modified without departing from the technical concept of this invention.

For example, although it was described in the above for the present embodiment that it displays both the authenticated users' data receiving addresses and the publicly disclosed users' data receiving addresses are selectable as transmission destinations in using the scanning function, it is also possible to make only the authenticated users' data receiving addresses being assignable as transmission destinations in using the scanning function. In this case, transmission of data to a wrong data receiving address or an unnecessary data receiving address can be prevented.

Also, the user authentication method is not limited to the user authentication by means of entering the user name or password, the user authentication using IC cards, cellular telephones (using infrared, etc.), or biometrical authentication (using finger prints, etc.) can be used as well.

Figure 13:
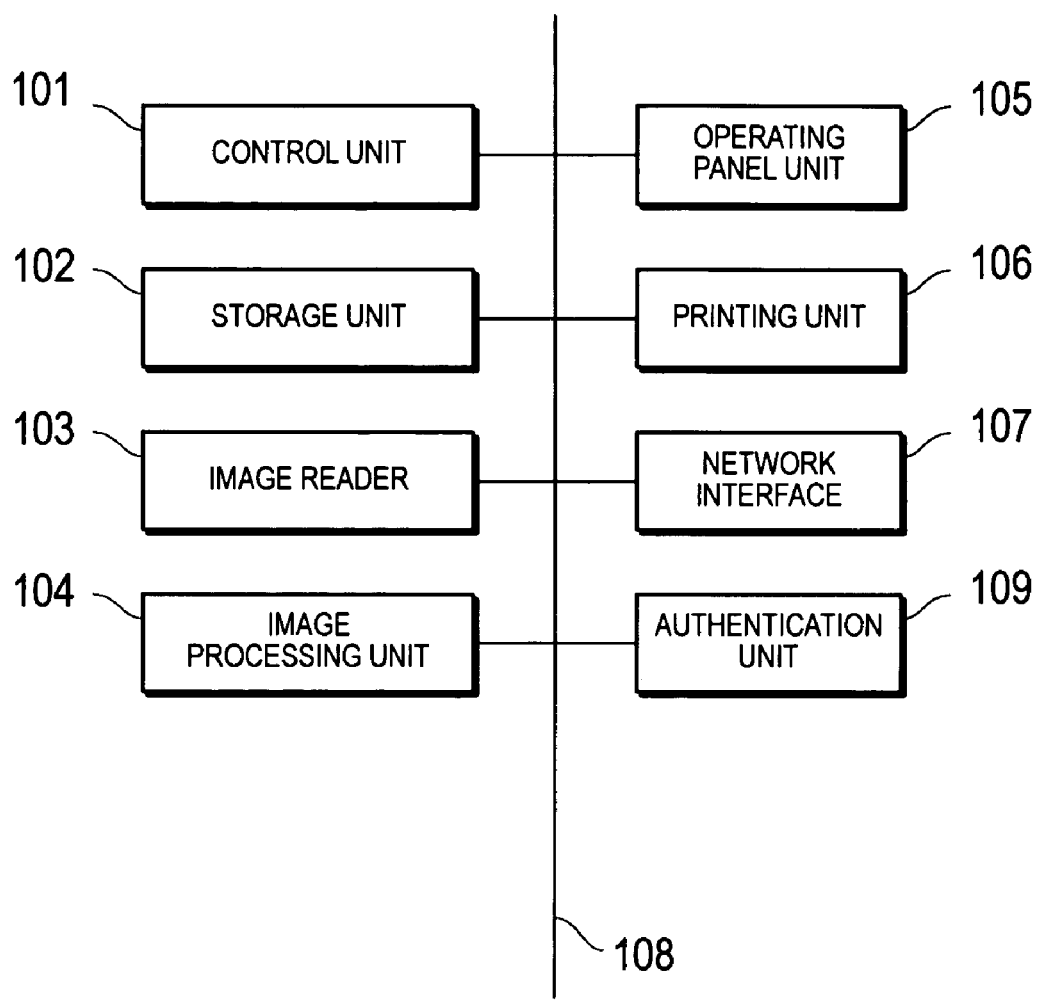
FIG. 13 is a block diagram showing the constitution of a MFP according to another embodiment.

Also, although the user authentication is done by means of the authentication server 600 in the abovementioned authentication process, the invention is not limited to it. As shown in FIG. 13, the MFP 100a has a authentication unit 109, so that the authentication process of the MFP 100a can be completed by the user authentication performed by the authentication unit 109.

Also, although the embodiment described above uses an MFP as the data transmission device, the invention is not limited to it. The present invention can be applied to other data transmission devices such as a network scanner and a data conservation device having a data transmission function.

Also, the means of conducting various processes in the data transmission device according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a memory device such as a hard disk. Said program can also be provided as independent application software or can be built into the software of the data transmission device as a part of its function.

What is claimed is:

1. A data transmission device, comprising:
   an address storing device for storing each user's addresses for receiving data;
   a user authentication device for authenticating a person as a specific user in response to an identification inputted by the person;
   an address searching device for searching a first address of the authenticated user for receiving data, and a second address of another user who approves of receiving data from the authenticated user;
   an address displaying device for displaying both of the addresses located by the address searching device when both of the first address of the authenticated user and the second address of the other user who approves of receiving data from the authenticated user are located by the address searching device, wherein when both of the first address of the authenticated user and the second address of the other user who approves of receiving data from the authenticated user are displayed, the address displaying unit displays the first address first, followed by the second address, each as candidates for transmission designation;

an address-designating device for designating an address selected from among the first address and the second address by the authenticated user, as a transmission destination; and a transmitting device for transmitting the data to the transmission destination designated by the address designating device.

2. The data transmission device as claimed in claim 1, further comprising an image reader for obtaining image data by scanning a document, wherein said transmitting device transmits the image data obtained by said image reader to the transmission destinations designated by said address designating device.

3. The data transmission device as claimed in claim 1, wherein the data receiving addresses related to said authenticated user are said authenticated user's data receiving addresses.

4. The data transmission device as claimed in claim 1, wherein said address searching device searches for data receiving addresses of said authenticated user and data receiving addresses of other users who approve receiving of data from said authenticated user, and said address designating device designates as transmission destinations the data receiving addresses selected by said authenticated user among said authenticated user's data receiving addresses and the data receiving addresses of other users searched by said address searching device.

5. The data transmission device as claimed in claim 4, wherein said address designating device designates the data receiving addresses of the authenticated user who is authenticated by said user authentication device as transmission sources when the data receiving addresses of said other users are designated as transmission destinations.

6. The data transmission device as claimed in claim 1, wherein said data receiving addresses include e-mail addresses.

7. The data transmission device as claimed in claim 1, wherein said data receiving addresses include specified addresses in the user's computer.

8. The data transmission device as claimed in claim 1, wherein said data receiving addresses include specified addresses in a FTP server.

9. The data transmission device as claimed in claim 1, further comprising an address displaying device capable of displaying the data receiving addresses located by said address searching device wherein said address displaying device displays data receiving addresses in a predetermined order of priority where a plurality of data receiving addresses are obtained by said address searching device.

10. The data transmission device as claimed in claim 1, wherein said address storing device is connected to said address designating device and said transmitting device via a network.

11. The data transmission device as claimed in claim 1, wherein said address searching device is connected to said address designating device and said transmitting device via a network.

12. The data transmission device as claimed in claim 1, wherein said user authentication device is connected to said address designating device and said transmitting device via a network.

13. A data transmission method comprising the steps of:
1) storing each user's addresses for receiving data in a memory;
2) authenticating a person as a specific user in response to an identification inputted by the person into an input device;
3) searching a first address of the authenticated user for receiving data, and a second address of another user who approves of receiving data from the authenticated user with an address searching device;
4) displaying both of the addresses located by the address searching device on a display when both of the first address of the authenticated user and the second address of the other user who approves of receiving data from the authenticated user are obtained by the address searching device, wherein when both of the first address of the authenticated user and the second address of the other user who approves of receiving data from the authenticated user are displayed, the display displays the first address first, followed by the second address, each as candidates for transmission designation;
5) designating an address selected from among the first address and the second address by the authenticated user, as a transmission destination; and
6) transmitting the data to the designated transmission destination.

14. A computer-readable data storage device storing a data transmission program, said data transmission program causing a computer to execute a process comprising the steps of:
1) authenticating a person as a specific user in response to an identification inputted by the person;
2) searching a first address of the authenticated user for receiving data, and a second address of another user who approves of receiving data from the authenticated user;
3) displaying both of the addresses located by the address searching unit when both of the first address of the authenticated user and the second address of the other user who approves of receiving data from the authenticated user are obtained, wherein when both of the first address of the authenticated user and the second address of the other user who approves of receiving data from the authenticated user are displayed, the first address is displayed first, followed by the second address, each as candidates for transmission designation;
4) designating an address selected from among the first address and the second address by the authenticated user, as a transmission destination; and
5) transmitting the data to the designated transmission destination.

* * * * *